United States Patent [19]

Mims et al.

[11] Patent Number: 5,174,375
[45] Date of Patent: Dec. 29, 1992

[54] HYDRAULIC RELEASE SYSTEM

[75] Inventors: Michael G. Mims, Bakersfield; Mark D. Mueller; John L. Hood, III, both of Santa Maria, all of Calif.

[73] Assignee: Union Oil Company of California, Los Angeles, Calif.

[21] Appl. No.: 693,352

[22] Filed: Apr. 30, 1991

Related U.S. Application Data

[63] Continuation-in-part of Ser. No. 676,266, Mar. 26, 1991, and a continuation-in-part of Ser. No. 569,691, Aug. 22, 1990, Pat. No. 5,117,915, and a continuation-in-part of Ser. No. 418,510, Oct. 10, 1989, Pat. No. 5,086,844, and a continuation-in-part of Ser. No. 589,321, Sep. 27, 1990, Pat. No. 5,086,843.

[51] Int. Cl.$^5$ ............................................. E21B 23/00
[52] U.S. Cl. ................................... 166/117; 166/187; 166/242
[58] Field of Search ............... 166/212, 214, 242, 117, 166/153, 154, 155, 156, 168, 285, 374, 381, 383, 187, 123, 125; 175/61, 62; 285/83, 102, 306

[56] References Cited

U.S. PATENT DOCUMENTS

| | | |
|---|---|---|
| 2,422,236 | 6/1947 | Church . |
| 2,500,276 | 3/1950 | Church . |
| 3,037,797 | 6/1962 | Brown ................................ 285/82 |
| 3,088,521 | 5/1963 | Graves ............................... 166/214 |
| 3,572,432 | 3/1971 | Aulick ............................... 166/114 |
| 4,064,953 | 12/1977 | Collins ........................... 175/294 X |
| 4,239,083 | 12/1980 | Silberman et al. ............. 166/117.7 |
| 4,497,371 | 2/1985 | Lindsey, Jr. ..................... 166/377 |
| 4,522,259 | 6/1985 | Akkerman ........................ 166/237 |
| 4,526,233 | 9/1985 | Stout ................................ 166/383 |
| 4,545,434 | 10/1985 | Higgins ............................ 166/217 |
| 4,611,662 | 9/1986 | Harrington .................... 175/320 X |
| 4,796,698 | 1/1989 | Gano ................................ 166/135 |
| 4,811,784 | 3/1989 | Theiss .............................. 166/208 |
| 4,856,591 | 8/1989 | Donovan et al. ............. 166/380 X |

FOREIGN PATENT DOCUMENTS 0908564  8/1972  Canada ............................... 166/156

Primary Examiner—Terry Lee Melius
Attorney, Agent, or Firm—Gregory F. Wirzbicki; William O. Jacobson

[57] ABSTRACT

A hydraulic setting and release system for run in and cementing of a work string and tubular within a borehole has a small diameter pipe string extending from a release tool through a packer to within the tubular. The system forms at least one annulus between the pipe string and tubular. The pipe string includes a ported nipple and a seat subassembly downstream of the ported nipple. The pipe string allows the packer to anchor the tubular, by being inflated through the port even when the seat is blocked. The pipe string also forms a flotation annulus which is sealed by, and the pipe string is supported by, a drag/seal subassembly downstream of the seat assembly. The system also includes a safety release tool for reliable uncoupling. Uncoupling is accomplished after run in, displacing a cement slurry slug separated by a plug or dart using a following pump down fluid which can land on the seat and block further flow and displacement of cement slurry, and anchoring. The release tool is then actuated uncouple the drill string from the cemented tubular and removal of the drill string prior to well operation (e.g., oil production).

27 Claims, 1 Drawing Sheet

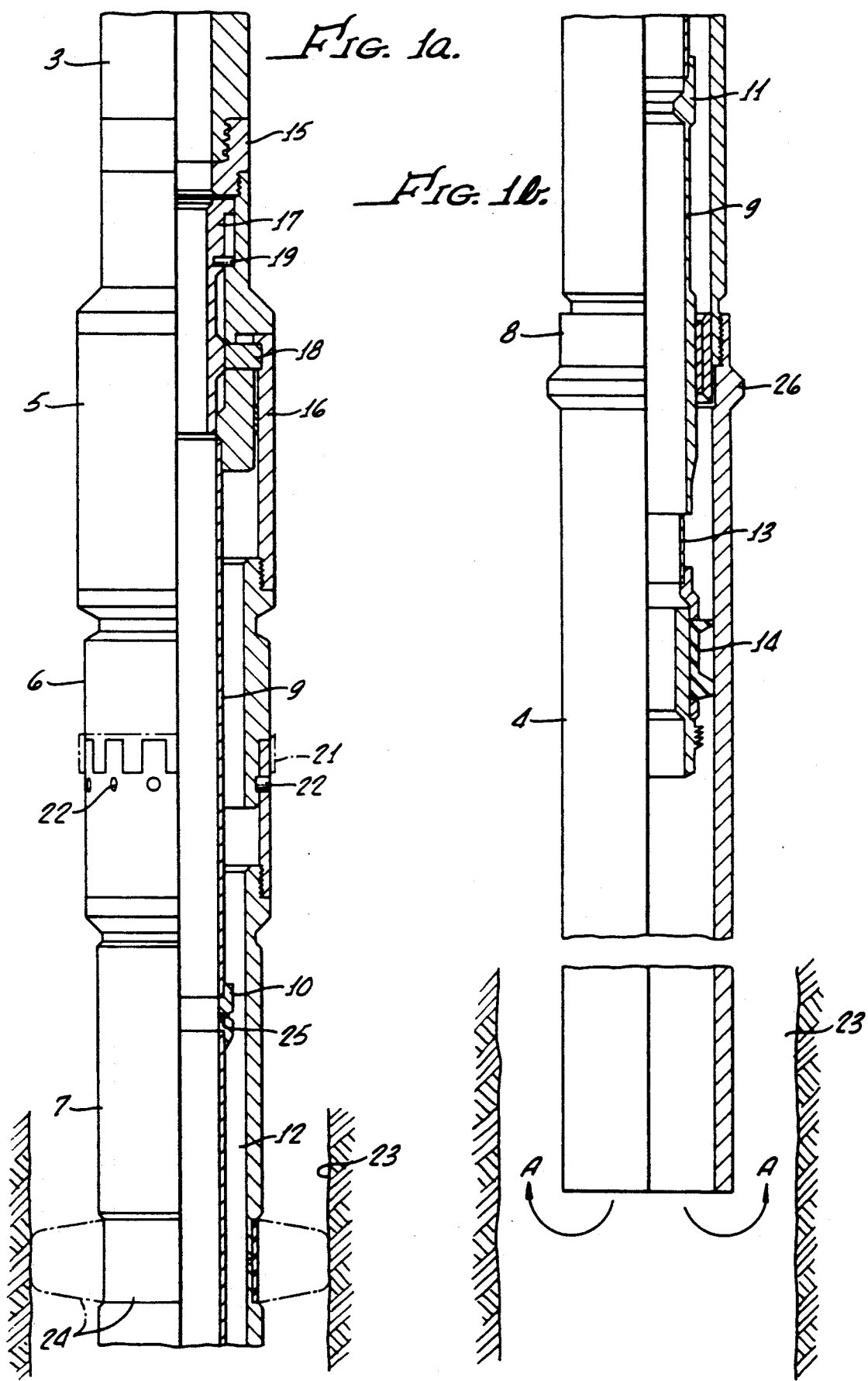

# HYDRAULIC RELEASE SYSTEM

CLAIM FOR PRIORITY

This application is a continuation-in-part of following copending applications, Ser. No. 07/676,266, filed Mar. 26, 1991, Ser. No. 07/569,691, filed on Aug. 22, 1990, U.S. Pat. No. 5,117,915, Ser. No. 07/418,510, filed on Oct. 10, 1989, U.S. Pat. No. 5,086,844, and Ser. No. 07/589,321, filed on Sep. 27, 1990, U.S. Pat. No. 5,086,843. These applications are incorporated in their entirety herein by reference.

BACKGROUND OF THE INVENTION

The present invention relates to tools and methods used in drilling and completing oil wells. In particular, the invention relates to a system that can be used to reliably release a drill string coupled to a liner after running the liner into a well, especially an extended reach well.

An extended reach well can be defined as a borehole having a major portion at a high angle to the vertical, typically having a short vertical portion followed by a long, nearly horizontal portion. The result is that the bottom of the well may be relatively shallow (e.g., less than 3,000 feet) but horizontally displaced a great distance (e.g., greater than 5,000 feet) from the top of the well.

When drilling a typical oil well, a rotating drill string and attached drill bit are used in conjunction with a flow of drilling mud to drill a borehole. After the borehole is drilled, a casing may be run in the borehole across unproductive intervals, and/or a liner may be run in across a productive interval. The liner or casing (or other tubulars) may be removably attached to a drill or work string during the run in operation.

Running the liner through an extended reach well can be difficult because of friction between the liner and the borehole wall. A drag force is caused by the weight of the liner and drill pipe bearing against a near horizontal wall of the borehole. The drag force can cause serious problems.

Several methods are known to cope with this drag problem. Increasing the lubricity of the drilling mud has been used to reduce the friction-caused drag during the running of the liner or casing. Running tubulars may also require a flotation cavity as described U.S. Pat. No. 4,986,361 (and incorporated herein by reference) to reduce the effective weight and thereby decrease drag forces. However, the flotation cavity can prevent the flow of drilling muds. Even with a decreased effective weight, running a floated liner dry (without a circulation of drilling mud) can offset any decrease in drag resulting from the decreased effective weight.

Still further, conventional tools to run tubulars into extended reach well holes have not been able to rotate the tubulars while they were being run in. One direction of rotation is conventionally used to release the run in tool from the tubular once it is in place. Thus, oscillations in rotating torques and string weight may cause the conventional connections to release prematurely. Other conventional tools permit rotation after run in, but these tools may require operational interruption and may also not allow fluid (e.g., drilling muds or cement slurry) flow past the tool.

Once the casing or liner is in place, tools which do not allow fluid flow are typically replaced so that a cement slurry slug can be injected to cement the tubular to the wall of the borehole. The cement slurry slug is pumped down through the drill pipe, tools, tubular, and into a borehole annulus between the liner or casing and the borehole wall. The cement slurry slug is typically followed downhole by drilling mud or other pump down fluid. The cement slurry slug is conventionally separated from the pump down fluid by a wiper or drill pipe dart which passes through the drill string, releasing tool and most of the casing or liner. The dart conventionally stops or lands near the bottom of the casing or liner at a landing collar. The collar and landed dart prevent any further displacement of the cement slurry until the cement sets. Once the liner or casing is cemented in place, the drill pipe is uncoupled from the tubular, and the drill pipe is removed from the borehole. Residual cement, float shoe, dart, and float collar can then be removed in a drill out operation prior to production from the well.

Because of these various tool limitations, it has not been generally possible to float, rotate, and flow lubricating fluid during run in of tubulars, and then flow cement slurry, position the slurry, anchor, and cement the tubular without at least interrupting operations and changing tools. In addition, the reliability of the dart passing through near horizontal tools and tubulars to the landing collar may not be as high as desired. Tools, for example, may constrict and trap the dart before passage through the tubular, preventing acceptable slurry fill of the borehole annulus and cementing. This results in inadequate sealing of the borehole annulus as well as a failure to uncouple the tubular and remove the work string.

SUMMARY OF THE INVENTION

The present invention provides an economic and highly reliable system and method for separating a drill string from a liner or casing, especially those which have been rotated and "floated" during run in, then anchored and cemented in place. The apparatus of the system includes a smaller diameter pipe string or stinger extended from a release tool to within the tubular, forming a tubular annulus between the stinger and tubular. The stinger includes a ported nipple and a seat subassembly downstream of the ported nipple. The tubular annulus is sealed by a drag/seal subassembly downstream of the seat assembly near the top end of the stinger. Near the bottom of the stinger, a liner wiper plug is attached to the stinger allowing fluid flow through the stinger and circulation of fluid back up the borehole annulus. The system also includes an hydraulic release tool or primary joint operated by fluid pressure, a secondary joint or safety release tool, and an inflatable packer (or other liner top device) for anchoring or sealing the system within the borehole. After run in, a cement slurry slug is pumped down to the borehole annulus and the liner top device(s) are set through the ported nipple to position, anchor, and properly seal the tubular in place. The release tool is then actuated to uncouple the drill string from the cemented tubular and the drill string is removed prior to well operation (e.g., oil production).

If the liner wiper plug fails to land and seal on its seat in the landing collar or float collar, it often becomes impossible to set the fluid actuated devices at the top of the liner. A positive displacement dart with a landing device is inserted into the fluid stream a measured volume after the cement slurry provides a backup pressure seal to allow the fluid actuated liner top devices to be set. The dart lands on the seat subassembly, plugging the stinger fluid passage downstream of the seat. This plugging of fluid flow assures that the cement slurry is properly positioned and also allows increased pressure to be applied at the liner top devices and the hydraulic release tool. If the increased fluid pressure is still unable to release the primary joint, the safety joint can be released upon application of an increased axial force and/or fluid pressure.

The invention avoids the need for (or provides a reliable backup for) the conventional liner wiper plug sealing on its seat device. Therefore, if the liner wiper plug assembly fails to seal on its seat, the displacement process will continue until the back up dart (with landing device) lands in the seat subassembly below the ported nipple. This will occur prior to the balance of the cement, left inside of the liner, from being displaced outside of the liner (causing a failure to seal off the bottom of the liner). The invention provides a removable stinger, plug and plug seat, combined with a process of a secondary slug of fluid above the cement to position the cement slurry and allow it to set. The removal of the drill string now also removes the attached stinger (and seated plug).

The system and method allow rotation of a "floated"-'casing or liner while a lubricating flow of fluid is accomplished during run in. Flowing and then displacing cement slurry only to a position behind the liner or casing, anchoring by setting of the liner top device (e.g., inflation/deflation of an inflatable packer), and uncoupling are accomplished without significant interruption or changing of tools. The system allows flow to the borehole until the slug of cement slurry is properly positioned behind the tubular, then restricts this flow while allowing fluid flow to set the liner top device. Pressure can also be reliably increased to actuate the hydraulic release tool. A back-up high torque safety joint is also provided for still further reliability. The tool assembly also permits rotation and axial reciprocation of the liner during cementing to reliably fill the borehole annulus and remove air bubbles.

BRIEF DESCRIPTION OF THE DRAWINGS

The drawing (FIGS, 1a and 1b) shows a separated, half-section view of a hydraulic release system, especially suitable for liner run-in, cementing, and release of an attached work string.

DESCRIPTION OF THE PREFERRED EMBODIMENT

In order to assure reliable operation of a hollow piston actuated release tool such as described in U.S. patent application Ser. No. 07/626,266, filed Mar. 26, 1991, a plug or dart was landed on the piston to stop fluid flow. Stopping fluid flow and the increased surface area presented by the plug provided additional force to move the piston and uncouple the tool.

However, once this plug was landed on the piston, downstream pressure could not be controlled. One important function that would be sacrificed by plugging the piston is positioning or anchoring the liner by means of an inflatable packer. Although the packer is not essential, it aids in assuring proper cementing of the liner or casing. The preferred embodiment now allows increased force to be applied to the hollow piston of the release tool without sacrificing the operation of an inflatable packer.

With reference to FIG. 1, a release system 2 couples a drill or work string 3 to liner (or other tubular) 4. The release system is comprised of an outer string and an inner string of duct-like or hollow bore components. At the top of both the outer and inner strings is a primary release joint or hydraulic release tool 5 (attached to the lower end of drill string 3) operated by hydraulic fluid pressure. This is followed downhole in the outer string by a secondary release joint or safety release tool 6, an inflatable packer 7, and a drag/seal subassembly 8 attached to the liner 4. Within these components, a smaller diameter stinger or inner pipe string 9 is also attached to the hydraulic release tool 5. The inner pipe string 9 includes a ported nipple 10 and a seat subassembly 11.

The inner string 9 and outer string of components form a first inner annulus or first annular space 12, sealed at the top by the primary release joint 3. The inner pipe string 9 may be supported at the bottom of the first annular space 12 by the drag/seal subassembly 8, but whether supporting or not, the drag/seal subassembly forms the bottom seal of the first inner annular space 12. The drag/seal subassembly 8 also forms the top seal of a second annular space or air annulus 13 between the pipe string 9 and liner 4. The bottom seal of the air annular space 13 is provided by a liner wiper plug 14 attached to the end of the pipe string 9. Although the air annulus is preferably filled with air, the air annulus can be evacuated or filled with another fluid, preferably a fluid having a density lower than the density of the drilling mud or other pump down fluids.

The preferred embodiment of the hydraulic release tool 5 is as described in U.S. patent application Ser. No. 07/626,266, filed Mar. 26, 1991, and incorporated herein by reference. The tool 5 comprises a shear out setting assembly 15 and a coupling running head 16. The shear out setting assembly 15 and the running head 16 have clear-through axial bores for flowing working fluids used in drilling and completing a well.

The shear out setting assembly has four radially extended dogs 18 that attach the shear out assembly to the running head when extended and release the two when retracted. Lands on a piston 17 can urge or retain the dogs 18 in the outward position when the piston 17 is in the setting position shown. The piston is retained in the setting position shown by a plurality of shear pins 19.

A force created on dissimilar fore and aft areas of the piston 18 by an actuating fluid pressure ruptures the shear pins 19, allowing axial movement of the piston 18 and retraction of the dogs into radial recesses of the piston. These shear pins 19 extend from the piston 18 to the body of the setting assembly 15.

Running head 16 has sockets to accept the extended dogs 18, releasably coupling the running head 16 to the setting assembly 15. The dogs may be chamfered to permit easier axial engagement of the dogs by the running head and to help force the dogs to retract if dog retraction forces (e.g., supplied by a spring or actuating arm) are not sufficient. Alternatively, other chamfers on other faces of the dogs can also apply retraction forces when other rotational or translational forces are applied to these faces.

Before proceeding with the detailed description of the remainder of the system, the operation of the hydraulic release tool as adapted for running in liners will be briefly described.

With shear out setting assembly 15 and running head 16 attached together by engaging dogs 18, the release tool 5 is rotated or turned by drill pipe 3 attached to a running head 16, which transfers the torque and turns the liner 4. The liner 4 can be run into the borehole while being turned and while a lubricating fluid, such as drilling mud, is being flowed down from the surface through the internal bores or fluid passageways of the assembly and out the bottom to the borehole to be recirculated back to the surface via a borehole annulus (as shown by arrows A). Accordingly, the running friction between the wall of the borehole and the liner will be lower than it would be if the liner were not lubricated, rotated, or translated (e.g., higher static friction would cause higher drag). Because of the rotation & lubrication, the problem that friction creates in high angle, extended reach well holes is substantially reduced.

Continuing the detailed description, the running head is attached at the lower end to the upper end of a safety release joint or tool 6. The preferred embodiment of the safety release tool 6 is as described in U.S. patent application Ser. No. 07/589,321, filed on Sep. 27, 1990, and incorporated herein by reference. The slotted tongue in groove mating surfaces 20 of separable parts of the safety tool 6 may be protected by a cover 21 (shown dotted for clarity). Shear pins 22 are also used to maintain the joint coupled until sufficient axial pulling-apart forces and/or pressures are applied to rupture the shear pins 22. Rupture pressure and/or forces are designed to be above those normally required to run in the liner 4 and uncouple using the hydraulic release tool 5.

The lower end of the safety tool 6 is attached to an upper end of an inflatable packer or other liner top device 7. In the preferred embodiment, the inflatable packer is available from K&M Enterprises, located in Bakersfield, Calif. The packer can seal the borehole annulus and serve as a top anchor for the liner 4 within the borehole 23.

The inflatable packer is one of many liner top devices to position or anchor the liner. The packer comprises an inflatable membrane 24 which inflates to seal the borehole annulus between the exterior of the system 2 and the borehole 23 (shown only in part for clarity). Fluid to inflate the membrane 24 (shown deflated and one side dotted when inflated for clarity) is supplied from the inner pipe string 9 through port 25 of ported nipple 10. After passing through the port 25, fluid flows into the first inner annulus 12 and radially outward towards the inflating membrane 24. The port 25 may alternatively include a valve or other means to maintain sealing pressure until released (not shown). The valve is preferably a pressure actuated, two position (open and closed positions) valve.

The remaining lower end of the inflatable packer 7 is attached to the upper end of a drag/seal subassembly 8. In the preferred embodiment, the drag seal assembly is available from K&M Enterprises located in Bakersfield, Calif. The drag/seal subassembly 8 primarily seals, but may also support the inner pipe string 9 on a load bearing surface which transfers any axially downward load to the drill string 3 via the packer 7, safety joint 6 and primary release tool 5. Transferring the load improves the reliability of the system, especially for long inner pipe strings 9 and long air annular spaces 13. The radial protrusion or centralizer 26 tends to center the assembly within the borehole 23; thus protecting the liner top devices from damage and wear while rotating in the hole. The drag/seal assembly 8 also allows the pip string 9 to be removed (dragged through) when the release tool 5 is uncoupled and removed. The liner wiper plug 14 has been pumped to bottom during the previously mentioned displacement process, prior to release. The liner wiper plug is deformable to adapt to several internal diameters. The liner wiper plug may also be separable from the inner pipe string 9 to allow removal of the inner pipe string.

The interfacing surfaces of the drag/seal subassembly 8 also form the topmost seal of the second or air annulus cavity 13. This cavity typically extends a majority of the length of the liner 4. (The length of the liner 4 shown is not intended to be representative.) The air annulus cavity 13 and methods for using it to reduce drag during run in operations is further described in U.S. patent application Ser. No. 07/569,691, filed on Aug. 22, 1990, incorporated herein by reference.

When the liner has been run into the borehole, setting and cementing operations are typically initiated. A slug of cement slurry is introduced into the drill string 3 and displaced downhole. The slug is sized to cement the liner 4 to the walls of the borehole 23. Although not necessary, the slug of cement slurry can be separated from other fluids by a solid separator or drill pipe dart (typically composed of an elastomeric compound and cup shaped, but not shown for clarity). Drill pipe darts are available from K&M Enterprises, located in Bakersfield, Calif. This drill pipe dart is displaced through the drill pipe and, eventually, latches into the liner wiper plug. A subsequent increase in pressure (typically approximately 1000 psig or 69.0 atmospheres) will act to shear the pins which couple the liner wiper plug to the stinger assembly.

A positive displacement dart with a landing device attached is injected after the drill pipe dart and an intervening volume (or second fluid slug between the cement slurry slug/drill pipe dart and remaining displacement fluid/positive displacement dart). The approximate intervening volume is preferably equal to the volume of the pipe string 9 and liner (excluding the air annulus 13) below the seat subassembly 11. If used, the combination drill pipe dart and liner wiper plug assembly separating the uppermost portion of the cement slurry slug from subsequent fluids injected into the drill string 3 eventually lands on a landing collar and/or float collar/float shoe assembly (not shown) or liner wiper plug (and dart landing collar) 14 near the bottom of the liner 4 so that the cement slurry is substantially in place between the liner 4 and borehole walls 23. The liner can be further rotated or axially reciprocated to evenly distribute the cement slurry, reliably coat the borehole annulus walls, and remove air bubbles in the slurry. The liner top device 7 is set to seal the borehole annulus and anchor the liner to the borehole.

Once anchoring and/or cementing is essentially completed, hydraulic pressure within the drill string 3 is increased sufficiently to fail shear pins 19, and the piston 17 moves downward. When the piston moves downward, it presents a relief to the base of dogs 18. The dogs are biased or are actuated inward, releasing coupling running head 16.

EXAMPLE

A system similar to that described can be generally partially assembled or pre-assembled prior to bringing the components to the location of a well for run in of a tubular. The tubular for this example is a 7 inch (17.8 cm) nominal diameter, 0.0408 inch (0.1036 cm) thick string made up of 42 foot (1.28 meter) long liner sections. The system uses a 7 inch (17.8 cm) nominal K&M Hydraulic Release Tool, a 7 inch (17.8 cm) nominal K&M Safety Release Tool, a K&M 7 inch (17.8 cm) nominal Integral Casing Packer (ICP) as the liner top anchor and borehole annulus seal, an 8⅜ inch (21.27 cm) nominal fluted drag/seal subassembly, a 3½ inch (8.89 cm) nominal ported nipple, a 3½×2.50 inch (8.89×6.35 cm) nominal seat subassembly, a 3½ inch (8.89 cm) nominal diameter inner pipe string, a 7 inch (17.78 cm) nominal float shoe, a 7 inch (17.78 cm) nominal float collar, and a 7 inch (17.78 cm) nominal liner wiper plug.

Approximate surface design actuation and/or shear pressures are as follows:

| | |
|---|---|
| Liner wiper plug with pipe dart latched in | 1000 psig (69 atmospheres) |
| Opening valve on ICP | 1500 psig (103 atmospheres) |
| Closing valve on ICP | 1200 psig (83 atmospheres) |
| Hydraulic Releasing Tool without positive displacement dart on seat | 2200 psig (151 atmospheres) |
| Hydraulic Releasing Tool with positive displacement dart on seat | 2200 psig (151 atmospheres) |
| Maximum load rating | 340,000 pounds (764.388 dynes × $10^6$) |
| Maximum torque rating | 110,000 ft-lbs (81.121 joules) |
| Safety joint | 180,000 lb (404.676 dynes × $10^6$) |

A float shoe and float collar are picked up (at least a two shoe joint is preferred) and made up or assembled to near the bottommost end of the liner. The liner wiper plug/landing collar is made up to the liner one liner joint above the float collar. The remaining liner and smaller diameter pipe string are picked up and run into the well. After changing elevators to 5 inch (12.7 cm) nominal diameter elevators, the ICP, safety joint, and hydraulic release head with drag/seal subassembly cross-over on bottom are made up to the liner and smaller pipe string. A drilling bumper subassembly and drill string are made up on the top of the hydraulic release tool and the liner is run to bottom while rotating the assembly. If necessary, circulating drilling mud may also be accomplished during run in.

After run in, a slug of cement slurry is injected into the assembly with a drill pipe dart dropped behind the cement slug. A following injection of drilling mud is used to displace the cement slurry slug until the dart lands on the liner wiper plug. During the displacement, a positive displacement dart is dropped behind the drill pipe dart when the volume of mud is equal to the liner below the landing collar, minus approximately 1 bbl (159 liters). When the liner wiper plug bumps on the landing collar, surface fluid pressure is increased to 2300 psig to open and inflate the ICP. The pressure is held for approximately 5 minutes, then increased and decreased to bleed off and lock in the packer. The fluid pressure is again increased to approximately 2200 psig to release the hydraulic release tool. Release will be indicated by regaining (or increased flow) circulation and reduced torque to rotate the assembly. The drill string (and attached portions of the assembly) is then pulled out of the running head portion of the hydraulic release tool (and attached components, including the cemented liner).

If the liner wiper plug does not bump, the positive displacement dart will land in the seat subassembly below the ported nipple. Pressure is varied as hereinbefore described to inflate and set the packer, then uncouple and release the liner from the drill string. If the hydraulic release tool fails to release, an increased fluid pressure and/or surface pull is applied sufficient to release the safety joint.

Alternative embodiments of the hydraulic release system can include: using other pressure actuated means to releasably couple, such as a rupture disc mounted on a fluid side stream upstream of an actuating piston and avoiding the need for shear pins, or a bourdon tube attached to a latching mechanism, or a pressure transducer signal actuating a solenoid controlled unhooking device; using other pressure actuated means for positioning, anchoring and/or sealing the inner pipe string, such as spring loaded radial pistons or probes extending from the liner to the walls of the borehole, wherein increased pressure tends to extend the probes into the formation; deleting the liner wiper plug and depending upon orientation and density differences to contain the air in the air annulus; adding more protrusions or centralizers to the outside surfaces of the liner and/or tools to position other portions of the liner near the center of the borehole; and using the release tool and a separately actuatable packer or other fluid actuated device to couple to a drill bit (even if flow to the drill bit is blocked), anchoring and uncoupling when the drill bit is stuck.

While the preferred embodiment of the invention has been shown and described, an example given, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. An apparatus for conducting a fluid and running a liner into an underground borehole comprising:
   a drill string having a bore and extending from a first end near a ground surface to a downhole end within the borehole;
   a hydraulically actuated releasing tool for releasably coupling said drill string to said liner and having an upwell end attached to said downhole end of said drill string and a downhole end attached to said liner, said tool having extendible dogs mounted on a first separable member and a second separable member having mating sockets, said tool having a fluid passageway in communication with said bore;
   an inflatable packer having a fluid passage and attached to a downhole end of said tool;
   a stringer also attached to the downhole end of said tool at least in part located within said fluid passage and having a fluid flow seat and fluid port for inflating said packer in fluid communication with said passageway, wherein said port can inflate said packer when fluid flow past said seat is blocked; and
   a liner attached to said packer.

2. The apparatus of claim 1 wherein said tool comprises:
   a body having a longitudinal axis and a longitudinal bore along the axis;
   a piston translatable in the bore of the body between a setting position and a release position, the piston also having a longitudinal bore and differential areas to effect a new force on the piston in response to hydraulic pressure in the bore of the body that tends to move the piston from the setting position to the release position;
   a plurality of dogs in the body extendable radially from the axis between a retracted position close to the axis and an extended position further from the axis and outwardly of the body;

means for moving the dogs between said extended and retracted positions when the piston moves into its release position;

means on the piston engaging the dogs for retaining the dogs outside the body when the piston is in the setting position; and means between the piston and the body for holding the piston in the setting position until a determinable hydraulic pressure exists in the body bore and to release the piston when the hydraulic pressure exceeds the determinable pressure so that the piston moves to its release position.

3. The apparatus of claim 2 wherein the means on the piston for engaging the dogs includes a land on the piston positioned to abut a base surface of the dogs in the setting position of the piston.

4. The apparatus of claim 3 wherein the moving means includes a rocker arm for urging said dogs radially inward when said piston moves from its setting position to its release position.

5. The apparatus of claim 4 wherein the holding means includes a plurality of shear pins between the body and the piston that fail at the pressure above the determinable pressure.

6. An apparatus for inserting a tubular coupled to a work duct into an underground cavity having a major axis using a fluid conducted by said work duct comprising:

a work duct extending from a near-surface end to a tool end when within the cavity;

a fluid actuated tool for releasably coupling said work duct to said tubular, said tool having a down end connected to said tubular and an up-end attached to said tool end of said work duct and having a fluid passageway in communication with said duct;

an outer structure connected to said tubular and an inflatable membrane connected to said outer structure for positioning said tubular with respect to said cavity, said membrane outwardly inflatable by said fluid supplied from said fluid passageway;

an inner duct having a fluid passage from a tool end to a tubular end, said tool end attached to said down end and said inner duct located at least in part within said fluid passageway to form a first inner annulus between said membrane and said inner duct, the inner duct comprising:

first means for restricting fluid flow from said fluid passage to said inner annulus; and second means for restricting fluid flow from said fluid passage to a tubular end wherein said second restricting means does not substantially restrict fluid flow through said first restricting means.

7. The apparatus of claim 6 wherein said membrane is inflated by fluid supplied from said inner annulus.

8. The apparatus of claim 7 wherein said inner duct also comprises first seal for sealing and separating said inner annulus into a first and second annulus, said first seal located between said first restricting means and said tubular proximate end.

9. The apparatus of claim 8 wherein said first seal also comprises means for transferring forces generally along said axis from said inner duct to outer structure.

10. The apparatus of claim 9 wherein said means for transferring force and said first seal comprise a drag and seal subassembly.

11. The apparatus of claim 9 wherein said inner duct extends within most of said tubular and said inner duct also comprises means for containing air with said second.

12. The apparatus of claim 11 which also comprises a separable disconnect attached between said tool and said membrane.

13. The apparatus of claim 12 wherein said separable disconnect comprises a high torque safety joint.

14. The apparatus of claim 13 wherein means for containing air comprises a liner wiper plug attached to the tubular end of said inner duct.

15. The apparatus of claim 14 wherein said second restricting means comprises a seat capable of retaining a fluid flow plug when said fluid within said work duct is less than a first pressure.

16. The apparatus of claim 15 wherein said first pressure is at least about 3000 psig and said plug comprises a positive displacement dart.

17. The apparatus of claim 16 wherein said membrane and structure comprises an inflatable packer capable sealing when said fluid within said work duct is at least about 2300 psig.

18. The apparatus of claim 17 wherein said tool comprises:

(i) a body having a longitudinal axis and a longitudinal bore along the axis;

(ii) a piston translatable in the bore of the body between a setting position and a release position, the piston having a longitudinal passageway and face to effect a net force on the piston in response to hydraulic pressure in the bore of the body that tends to move the piston from the setting position to the release position;

(iii) a plurality of dogs in the body extendable radially from the axis between a retracted position relative to the axis and an extended position further from the axis and outwardly of the body;

(iv) means for moving the dogs from said extended to said retracted position when said piston moves from said setting to said release position;

(v) means for holding the piston in the setting position until a predetermined hydraulic pressure exists in the body bore and to release the piston when the hydraulic pressure exceeds the predetermined pressure so that the piston moves to its release position; and (vi) a coupling member having means for coupling to said extended dogs.

19. The apparatus of claim 18 wherein said coupling member comprises recesses for receiving the dogs in their extended position and attaching the coupling member to the body.

20. The apparatus of claim 19 wherein said first means for restricting fluid flow comprises a ported nipple.

21. An apparatus for conducting a fluid and running a tubular into a cavity having a major axis comprising:

a work duct having a bore and extending from a first end to a downhole end when within the cavity;

a fluid-actuated release tool having an up end attached to said downhole end of said work duct, said tool having means for releasably coupling said work duct to said tubular, said tool having a fluid passageway in communication with said bore;

fluid actuated means for positioning said tubular having a fluid passage and attached proximate to a down end of said tool;

an inner duct also attached proximate to the down end of said tool and at least in part located within said fluid passage and having a fluid flow seat in fluid communication with said passageway and a fluid part for actuating said means for positioning in fluid communication with said passageway, wherein said fluid flowing through said fluid port can actuate said positioning means when fluid flow past said seat is blocked; and a tubular attached to said positioning means and generally in fluid communication with said seat.

22. The apparatus of claim 21 wherein said apparatus is capable of rotation and axial reciprocation when a rotating torque of no more than 110,000 ft-lbs is applied and an axial force of no more than 340,000 lbs.

23. The apparatus of claim 22 wherein a float collar is absent from said tubular.

24. The apparatus of claim 23 wherein a float shoe is also absent from said tubular.

25. An apparatus for conducting a fluid and drilling a borehole using a drill bit comprising:
    a work duct having a bore and extending from a first end to a downhole end when within the borehole;
    a fluid-actuated release tool having an up end attached to said downhole end of said work duct, said tool having means for releasably coupling said work duct to said drill bit, said tool having a fluid passageway in communication with said bore;
    fluid-actuated means for contacting walls of the borehole and having a fluid passage, said means attached proximate to a down end of said tool;
    an inner duct also attached proximate to the down end of said tool and at least in part located within said fluid passage and having a fluid flow seat in fluid communication with said passageway and a fluid port for supplying said fluid to said contacting means, said port in fluid communication with said passageway, wherein said fluid flowing through said fluid part can actuate said contacting means when fluid flow from said work duct past said seat is at least partially blocked; and
    a drill bit attached to said contacting means and generally in fluid communication with said seat.

26. The apparatus of claim 25 wherein an uncoupling surface of said tool enables a fishing tool to attach and retrieve said stuck drill bit.

27. The apparatus of claim 25 wherein said fluid actuated means for contacting comprises an inflatable packer.

* * * * *

UNITED STATES PATENT AND TRADEMARK OFFICE
CERTIFICATE OF CORRECTION

PATENT NO. : 5,174,375

DATED : December 29, 1992

INVENTOR(S) : Mims et al.

It is certified that error appears in the above-identified patent and that said Letters Patent is hereby corrected as shown below:

Claim 21, column 11, line 5, delete "part" and insert therefor -- port --.

Claim 25, column 12, line 14, delete "part" and insert therefor -- port --.

Signed and Sealed this

Twenty-sixth Day of October, 1993

Attest:

BRUCE LEHMAN

*Attesting Officer*     *Commissioner of Patents and Trademarks*